United States Patent [19]

Salame

[11] Patent Number: 5,378,421
[45] Date of Patent: Jan. 3, 1995

[54] PROCESS FOR PREPARING THERMOPLASTIC CONTAINERS

[75] Inventor: Morris Salame, Windsor, Conn.

[73] Assignee: Pepsico, Inc., Purchase, N.Y.

[21] Appl. No.: 35,219

[22] Filed: Mar. 22, 1993

[51] Int. Cl.⁶ .................. B29C 35/02; B29C 49/18
[52] U.S. Cl. ..................... 264/230; 264/235; 264/342 R; 264/530
[58] Field of Search ............ 264/530, 572, 230, 235, 264/342 R, 346

[56] References Cited

U.S. PATENT DOCUMENTS

| | | | |
|---|---|---|---|
| 4,385,089 | 5/1983 | Bonnebat et al. | 264/529 |
| 4,550,007 | 10/1985 | Ohtsu et al. | 264/530 |
| 4,836,971 | 6/1989 | Denis et al. | 264/530 |
| 5,229,042 | 7/1993 | Denis et al. | 264/530 |
| 5,248,533 | 9/1993 | Sugiura et al. | 264/530 |

FOREIGN PATENT DOCUMENTS

| | | | |
|---|---|---|---|
| 155763 | 9/1985 | European Pat. Off. | 264/530 |
| 58-220711 | 12/1983 | Japan | 264/530 |
| 2062533 | 5/1981 | United Kingdom | 264/521 |

*Primary Examiner*—Catherine Timm
*Attorney, Agent, or Firm*—Bachman & LaPointe

[57] ABSTRACT

Process crystallizes at least a portion of a molecularly oriented thermoplastic container by heat treating at least portions thereof at temperatures suitable to crystallize the portions, including the steps of heating at a first temperature for at least 5 seconds below a final crystallization temperature to heat set the container, followed by heating at a second temperature for at least 10 seconds at a final temperature to obtain crystallinity above 40%, wherein each of the heating steps is accompanied by shrinkage and distortion of the container; and sizing said crystallized container to a final shape.

6 Claims, No Drawings

PROCESS FOR PREPARING THERMOPLASTIC CONTAINERS

BACKGROUND OF THE INVENTION

The present invention relates to an improved method for crystallizing stretch blow molded thermoplastic containers, especially polyethylene terephthalate (PET), by sequential heat treating to induce crystallization thereof.

According to current practice, of which U.S. Pat. No. 4,836,971 is an example, a partially crystallized container is made from an amorphous PET preform by crystallizing its neck, heating just its body to the orientation temperature of PET, blow molding an intermediate container in a cooled mold with a larger volume than that of the final container, heating the intermediate container to 180° to 220° C. for 1 to 15 minutes, and then re-shaping by blow-molding a second time to the final container dimensions. Such heating the intermediate container results in considerable deformation and shrinkage of the container, which necessitates the final molding operation, due to stress relief and, because said heating causes the formation of crystalline regions which have a greater density than the amorphous phase. Depending upon the amount and nature of the shrinkage, the re-shaping step is difficult to carry out and to control.

As is well known, it is highly desirable to crystallize molecularly oriented containers in order to improve their properties: crystallinity improves resistance to gas-permeation and strength and reduces gas solubility. In combination, these properties can provide a superior container to retain or exclude fluids, to avoid dissolving them in the container walls and to reinforce the structure. However, for these improvements to be worthwhile, high degrees of crystallinity must be obtained, e.g. 45% in the case of PET, which can only be accomplished at high temperatures for the process to be economical.

However, it is important to obtain the desirable properties of the crystalline phase without excessive shrinkage during the heat treating step. At such temperatures, attained in a short time, the deformation and shrinkage becomes irregular and excessive, and difficult to offset in the course of re-shaping.

It is known that deformation and shrinkage, as above, occur upon heating the molecularly oriented container, due to the relief of residual stresses, and increasingly with increasing temperature, due to the density of the crystalline phase. The treatment that results in such stress relief and relatively low levels of crystallinity is termed "heat-setting" and it is used widely to produce bottles that may be filled with liquid at elevated temperatures without Therefore, it is a principal object of the present invention to provide an efficient process for heat treating thermoplastic containers, especially of polyethylene terephthalate (PET), wherein stretch blow molded, molecularly oriented thermoplastic containers are highly crystallized in an efficient and effective manner by heat setting them before final crystallizing, thereby controlling shrinkage so as to facilitate the final shaping thereof.

It is a further object of the present invention to provide a process as aforesaid which is effective, expeditious and convenient to use on a commercial scale.

It is a still further object of the present invention to provide a process as aforesaid which obtains improved containers having greatly improved properties.

Further objects and advantages of the present invention will appear hereinbelow.

SUMMARY OF THE INVENTION

In accordance with the present invention, the foregoing objects and advantages are readily obtained.

The process of the present invention applies a crystallizing heat treatment to thermoplastic containers. Present processes crystallize a molecularly oriented thermoplastic container, as a stretch blow molded or thermoformed container by heating it, whereby the resulting degree of crystallinity depends on the temperature and time of heating. "Degree of crystallinity" denotes the ratio of the crystalline and amorphous phases present in a given sample. Crystallization is accompanied by shrinkage and distortion of the container, and the distorted container is subsequently sized to a final shape.

The process of the present invention crystallizes at least a portion of a molecularly oriented thermoplastic container by heat treating said portions thereof at a temperature suitable to crystallize, including the steps of heating below a final crystallization temperature for at least 5 seconds at a first temperature sufficient to heat set the container, followed by heating at a second temperature for at least 5 seconds at a final temperature sufficient to crystallize said container to a degree of crystallinity above 40%, wherein each of said heating steps is accompanied by shrinkage and distortion of the container. The distorted container is then rapidly formed into a final shape immediately following the second crystallization step, i.e., without interruption of the process.

For the preferred PET material, the first heating step is preferably at a temperature of from 120° to 180° C. for from 5 to 30 seconds, and the second heating step is preferably at a temperature of from 190° to 230° C. for 5 to 30 seconds. The second heating step should follow the first heating step without interrupting the process.

DETAILED DESCRIPTION OF THE PREFERRED EMBODIMENTS

The crystallizing step is highly desirable and is accompanied by shrinkage and distortion of the container, which is subsequently reformed to a final shape. Copending U.S. patent application Ser. No. 972,770 for PROCESS FOR HEAT TREATING THERMOPLASTIC CONTAINERS, By Emery I. Valyi, Filed Nov. 6, 1992 describes a preferred process for selectively crystallizing a molecularly oriented thermoplastic container by heat treating portions thereof at temperatures suitable to crystallize said portions according to the degree of orientation thereof, wherein the heat treatment takes place in a heating environment on an unconfined container, and wherein the heat treatment results in shrinking the container, and sizing said selectively crystallized container in a reforming means to form the container into a final shape. The general procedure of said copending application Ser. No. 972,770 is suitable for the procedure of crystallizing and forming in accordance with the process of the present invention. The disclosure of said copending application is hereby incorporated by reference herein.

Excessive shrinkage during the crystallization step is undesirable. The sizing or reformation step is more difficult to perform and control with an excessively shrunken or distorted container. In accordance with the present invention, the subject process is greatly improved by interposing a first heating step before the step of heating to finally crystallize, in order to stress relieve and heat set the container. The interposed step is at a first temperature at which crystallization proceeds only enough to heat set and is adapted to increase the resistance of the container to distortion in the course of the final, higher-temperature crystallization step.

Thus, the process of the present invention involves a duplex heat treatment regime with a heating step at a first lower temperature below the final crystallization temperature followed by the second heating step at that temperature. The first and second heating steps should preferably follow one after the other. Thus, where the process is conducted continuously as in a heating tunnel in accordance with copending application U.S. Ser. No. 972,770, a first section of the heating tunnel is maintained at the lower temperature and a second section is maintained at the higher temperature, with the molecularly oriented thermoplastic container to be crystallized being continuously moved. The rate of movement through the heating tunnel may be controlled according to the desired residence time at temperature.

Thus, for example, the first heating step to heat set a PET container is preferably held in the range of 120° to 180° C. for a period of 5 to 30 seconds, immediately followed the second heating step to crystallize in the range of 190° to 230° C. for a similar length of time, whereby the times at the first and second temperatures need not be identical and will depend mostly on the apparatus chosen to carry out the process.

Alternatively, the process of the present invention may operate in a step-wise manner by transferring the molecularly oriented thermoplastic container to be crystallized to a first heating means for heating at the first temperature followed by transferring to a second, final heating means for crystallization, followed by transfer to a sizing means to size the crystallized container to a final shape. Thus, the process of the present invention may operate continuously or discontinuously.

A molecularly oriented thermoplastic container when heated to near 210° C. for 30 seconds in a single heating station exhibited a volume shrinkage of approximately 20% "Volume shrinkage" as used herein refers to the contained volume within the container, rather than the volume of plastic of which the container is made.

An additional heating station of substantially identical design to the aforesaid crystallization heating station was then installed ahead of it, and used to heat the containers in accordance with the process of the present invention at a first temperature of 175° to 180° C. for 15 seconds to heat set them before transferring them into the original station where they were heated substantially as in the original experiment, for the same length of time, to crystallize as in the first experiment. The volume shrinkage in the second station in accordance with the present invention using the preliminary heat set procedure as aforesaid was substantially and surprisingly reduced, as visually observed, estimated to have amounted to a volume shrinkage of less than 10%. This less than 10% volume shrinkage was readily offset in the sizing or reforming fixture. The observation was visual because, to measure the volume accurately between the steps, the process would have to be interrupted, leading to false results.

Thus, a surprising advantage was obtained in accordance with the heating regime of the present invention.

At the minimal cost of lengthening the heating apparatus or adding another heating station depending upon which type of procedure is used, crystallization of up to 45% is readily obtained with greatly reduced shrinkage in the crystallization step. The resulting article being better suited to be formed into the final container shape than would otherwise be the case.

As indicated hereinabove, at least portions of the container are crystallized in accordance with the process of the present invention. As indicated in copending application Ser. No. 972,770, those portions of the container not desired to be crystallized should be protected from the heating in the crystallization step, as for example by restricting the heating to the body portion of the container. In addition, the final sizing step is preferably performed in a mold having the desired final shape wherein fluid pressure is injected into the softened container to conform same to the shape of the mold, all in accordance with conventional practice. The formation of the molecularly oriented thermoplastic container to be crystallized may be obtained by conventional means, as by expanding a parison or preform into the shape of a mold together with a stretching step, i.e., stretch blow molding.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed:

1. Process for preparing a crystallized thermoplastic container which comprises:

crystallizing at least a portion of a molecularly oriented body of a thermoplastic container by heat treating said portion(s) at temperatures suitable to crystallize said portion(s), including the steps of heating said portion(s) of said body at a first temperature for at least 5 seconds below a final crystallization temperature, followed by heating said portion(s) of said body at a second temperature for at least 5 seconds at a final temperature to obtain crystallinity above 4% in sail portions), wherein the first heating step is operative to stress relieve the container to increase resistance of the container in the higher temperature second heating step, wherein each of said heating steps is accompanied by shrinkage and distortion of the container; and sizing said heat treated container to a final shape thereby forming said crystallized thermoplastic container.

2. Process according to claim 1 wherein said thermoplastic container is polyethylene terephthalate.

3. Process according to claim 2 wherein the first heating step is at a temperature of 120° to 180° C. for from 5 to 30 seconds.

4. Process according to claim 3 wherein the second heating step immediately follows the first heating step and is at a temperature of from 190° to 230° C. for from 5 to 30 seconds.

5. Process according to claim 1 wherein the sizing step immediately follows the second heating step.

6. Process according to claim 1 wherein said shrinkage and distortion during the second heating step are reduced due to stress relieving during the first heating step.

* * * * *